(12) United States Patent
Wittbold et al.

(10) Patent No.: US 7,875,114 B2
(45) Date of Patent: *Jan. 25, 2011

(54) FOAMED SLURRY AND BUILDING PANEL MADE THEREFROM

(75) Inventors: James R. Wittbold, Des Plaines, IL (US); Bruce Lynn Petersen, Lisle, IL (US); Alfred Li, Naperville, IL (US)

(73) Assignee: United States Gypsum Company, Chicago, IL (US)

( * ) Notice: Subject to any disclaimer, the term of this patent is extended or adjusted under 35 U.S.C. 154(b) by 686 days.

This patent is subject to a terminal disclaimer.

(21) Appl. No.: 11/893,758

(22) Filed: Aug. 17, 2007

(65) Prior Publication Data

US 2008/0009565 A1    Jan. 10, 2008

Related U.S. Application Data

(63) Continuation-in-part of application No. 11/449,924, filed on Jun. 9, 2006, which is a continuation-in-part of application No. 11/152,418, filed on Jun. 14, 2005, now abandoned.

(51) Int. Cl.
    *C04B 11/00* (2006.01)
(52) U.S. Cl. .................. 106/772; 106/778; 106/823
(58) Field of Classification Search .......... 106/772, 106/778, 823; 524/4, 5
    See application file for complete search history.

(56) References Cited

U.S. PATENT DOCUMENTS

| 4,028,125 | A | 6/1977 | Martin |
|---|---|---|---|
| 4,202,857 | A | 5/1980 | Lowe |
| 4,238,239 | A | 12/1980 | Brown |
| 4,341,560 | A | 7/1982 | Saito et al. |
| 4,561,986 | A | 12/1985 | Villa et al. |
| 4,666,971 | A | 5/1987 | Greenhalgh |
| 4,814,014 | A | 3/1989 | Arfaei |
| 4,927,463 | A | 5/1990 | Kloetzer et al. |
| 4,960,465 | A | 10/1990 | Arfaei |
| 5,109,030 | A | 4/1992 | Chao et al. |
| 5,118,751 | A | 6/1992 | Schulze et al. |
| 5,223,036 | A | 6/1993 | Koyata et al. |
| 5,362,323 | A | 11/1994 | Koyata et al. |

(Continued)

FOREIGN PATENT DOCUMENTS

EP    0644165    3/1995

(Continued)

*Primary Examiner*—Paul Marcantoni
(74) *Attorney, Agent, or Firm*—Greer, Burns & Crain, Ltd.; David F. Janci, Esq.; Philip T. Petti, Esq.

(57) ABSTRACT

A gypsum slurry is described that includes water, a hydraulic component comprising at least 50% calcined gypsum by weight based on the dry weight of the hydraulic component, foam, a defoamer, a polycarboxylate dispersant having olefinic unsaturated mono-carboxylic acid moieties and (poly) oxyalkylene moieties, a first portion of a retarder and a second portion of a retarder. In some embodiments of the invention, the defoamer is combined with the dispersant prior to being added to the gypsum slurry. The defoamer and dispersant can be added as a physical mixture, wherein the defoamer is attached onto the dispersant polymer, or a combination thereof. In some embodiments, a gypsum building panel is made from the gypsum slurry.

21 Claims, 1 Drawing Sheet

U.S. PATENT DOCUMENTS

| | | | |
|---|---|---|---|
| 5,369,198 A | 11/1994 | Albrecht et al. |
| 5,387,626 A | 2/1995 | Bohme-Kovac et al. |
| 5,393,343 A | 2/1995 | Darwin et al. |
| 5,401,798 A | 3/1995 | Rasp et al. |
| 5,424,099 A | 6/1995 | Stewart et al. |
| 5,556,460 A | 9/1996 | Berke et al. |
| 5,614,017 A | 3/1997 | Shawl |
| 5,643,978 A | 7/1997 | Darwin et al. |
| 5,661,206 A | 8/1997 | Tanaka et al. |
| 5,670,578 A | 9/1997 | Shawl |
| 5,685,903 A | 11/1997 | Stav et al. |
| 5,703,174 A | 12/1997 | Arfaei et al. |
| 5,725,656 A | 3/1998 | Shimanovich et al. |
| 5,725,657 A | 3/1998 | Darwin et al. |
| 5,739,212 A | 4/1998 | Wutz et al. |
| 5,779,786 A | 7/1998 | Patel |
| 5,798,425 A | 8/1998 | Albrecht et al. |
| 5,834,576 A | 11/1998 | Nagano et al. |
| 5,858,083 A | 1/1999 | Stav et al. |
| 5,880,236 A | 3/1999 | Konrad et al. |
| 5,925,184 A | 7/1999 | Hirata et al. |
| 5,985,989 A | 11/1999 | Shawl et al. |
| 6,034,208 A | 3/2000 | McDaniel et al. |
| 6,043,329 A | 3/2000 | Lepori et al. |
| 6,150,437 A | 11/2000 | Wutz et al. |
| 6,166,112 A | 12/2000 | Hirata et al. |
| 6,187,887 B1 | 2/2001 | Albrecht et al. |
| 6,211,317 B1 | 4/2001 | Albrecht et al. |
| 6,264,739 B1 | 7/2001 | Yamato et al. |
| 6,281,307 B1 | 8/2001 | Muhlebach et al. |
| 6,294,015 B1 | 9/2001 | Yamashita et al. |
| 6,376,581 B1 | 4/2002 | Tanaka et al. |
| 6,437,027 B1 | 8/2002 | Isomura et al. |
| 6,527,850 B2 | 3/2003 | Schwartz et al. |
| 6,620,879 B1 | 9/2003 | Albrecht et al. |
| 6,777,517 B1 | 8/2004 | Albrecht et al. |
| 6,800,129 B2 | 10/2004 | Jardine et al. |
| 6,852,159 B2 | 2/2005 | Kinoshita et al. |
| 6,869,988 B2 | 3/2005 | Schwartz et al. |
| 7,070,648 B1 | 7/2006 | Schwartz et al. |
| 7,261,772 B1 | 8/2007 | Schwartz et al. |
| 7,393,424 B2 | 7/2008 | Schwartz et al. |
| 2003/0019401 A1 | 1/2003 | Schwartz et al. |
| 2003/0127026 A1 | 7/2003 | Anderson et al. |
| 2003/0167973 A1 | 9/2003 | Peev et al. |
| 2004/0045481 A1 | 3/2004 | Sethuraman et al. |
| 2004/0072939 A1 | 4/2004 | Cornman et al. |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0198873 A1 | 10/2004 | Bury et al. |
| 2004/0211342 A1 | 10/2004 | Sprouts et al. |
| 2005/0080298 A1 | 4/2005 | Inaoka et al. |
| 2006/0280899 A1 | 12/2006 | Liu et al. |

FOREIGN PATENT DOCUMENTS

| | | |
|---|---|---|
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

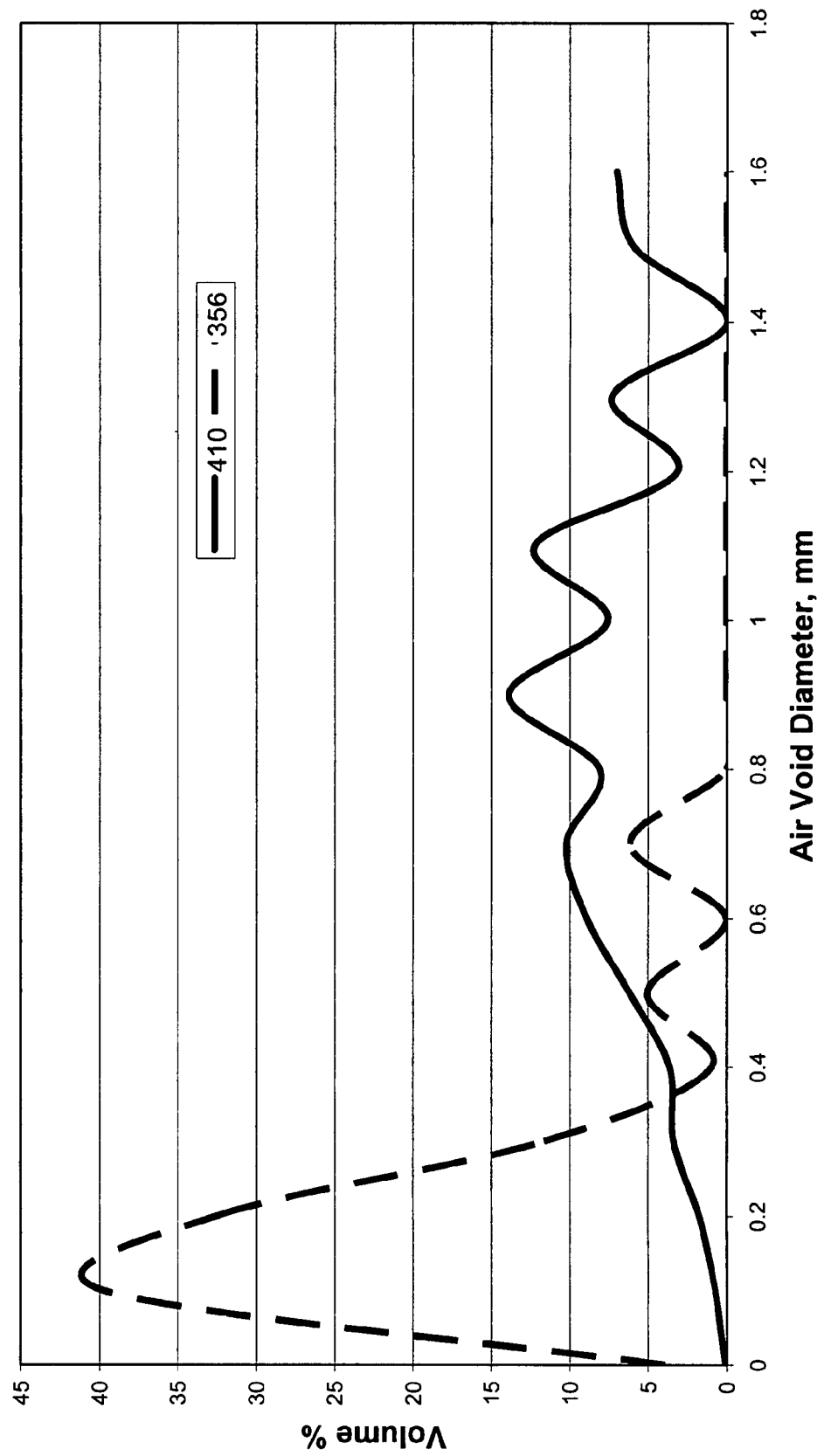

FOAMED SLURRY AND BUILDING PANEL MADE THEREFROM

CROSS-REFERENCE TO RELATED APPLICATIONS

This application is a continuation-in-part of U.S. Ser. No. 11/449,924 entitled "Gypsum Products Utilizing A Two-Repeating Unit Dispersant And A Method For Making Them", filed Jun. 9, 2006, which is a continuation-in-part of U.S. Ser. No. 11/152,418 entitled "Gypsum Products Utilizing A Two-Repeating Unit Dispersant And A Method For Making Them", filed Jun. 14, 2005, now abandoned, both herein incorporated by reference.

This application is further related to U.S. Ser. No. 11/894,029, filed concurrently herewith, entitled "A Liquid Admixture Composition" and herein incorporated by reference.

BACKGROUND OF THE INVENTION

This invention relates to a foamed gypsum slurry. More specifically, it relates to a foamed gypsum slurry that includes a defoamer to produce a distribution of foam bubbles. The gypsum slurry is useful for making building panels.

Gypsum building panels offer a high performance product for a reasonable price for finishing of building spaces. Gypsum, also known as calcium sulfate dihydrate, is heated to drive off crystalline water to produce calcium sulfate anhydrite and/or calcium sulfate hemihydrate, also known as stucco, calcined gypsum or Plaster of Paris. The building panels are made by combining dry stucco with water. Calcined gypsum and water are combined and an interlocking matrix of gypsum crystals is formed. After the hydration of the calcined gypsum, excess water is driven off by heating, the resulting product is a relatively strong panel, having a good surface for receiving decorative finishes such as paint or wallpaper.

Although gypsum building panels are cost effective, they are relatively heavy. The panels must be moved in small batches due to the weight. Installers who work with the panels become fatigued from lifting the panels and holding them in place to be secured. Additionally, heavy panels are costly to transport. One method of controlling the density of the product is by the addition of a soap-based foam to the liquid slurry. The stucco then sets around the foam bubbles, creating voids in the gypsum matrix. It is important to control the size of the bubbles to avoid undesirable properties in the panels. If the bubbles are too small, a large number of small bubbles are needed to effect the change in density. Where there are lots of bubbles in a confined space, the resulting gypsum matrix has a low compressive strength. Bubbles that are too large cause a decrease in strength and form unsightly blisters under the facing paper.

It has been found that if the gypsum is formed having a mixture of void sizes, it is possible to produce a building panel that is both strong and free of surface defects. Various soaps produce bubbles having different properties. Some soaps form bubbles that are very strong and stable, with little tendency to break and coalesce. For the purposes of this invention, a stable soap is defined as one developed to maximize air entrainment and minimize usage in gypsum slurries. Other soaps are less stable, forming foam, but becoming more unstable in the presence of gypsum. A combination of soaps that form stable and unstable foams allows for control of the production of larger foam voids in the gypsum slurry. Some embodiments of this invention utilize the combination of soaps described in U.S. Pat. No. 5,643,510, herein incorporated by reference.

Reduction in the amount of water needed to produce gypsum is also desirable. Water in excess of that needed to hydrate the calcined gypsum is removed by kiln drying. Fuel costs to operate the drying kiln make it advantageous to reduce the amount of water in a gypsum slurry, while maintaining similar flow characteristics.

In an attempt to reduce water usage by use of a polycarboxylate dispersant, it was found that the polycarboxylate dispersant interfered with formation of the desired bubble size distribution, and the ability to control formation of larger voids. Panel strength suffered due to the formation of very stable, very small bubbles. Addition of conventional polycarboxylate dispersants apparently change the surface chemistry of the bubbles, making it more difficult to obtain a desirable core structure. A desirable core structure is one that is engineered to have a distribution of bubbles in the slurry or voids in the set gypsum that include a number of large voids.

SUMMARY OF THE INVENTION

At least one of these problems is eliminated or reduced by the slurry and method described herein. More specifically, the invention provides for an improved gypsum slurry that includes water, a hydraulic component comprising at least 50% calcined gypsum by weight based on the dry weight of the hydraulic component, foam, a defoamer and a polycarboxylate dispersant. The dispersant is made up of a first and a second repeating unit, wherein said first repeating unit is an olefinic unsaturated mono-carboxylic acid repeating unit or an ester or salt thereof, or an olefinic unsaturated sulphuric acid repeating unit or a salt thereof, and said second repeating unit is of the general formula (I)

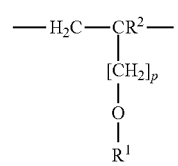

where $R^1$ is represented by

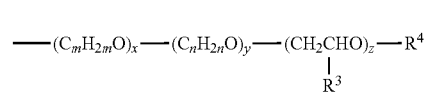

and wherein $R^2$ is hydrogen or an aliphatic $C_1$ to $C_5$ hydrocarbon group, $R^3$ is a non-substituted or substituted aryl group and preferably phenyl, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to the formula

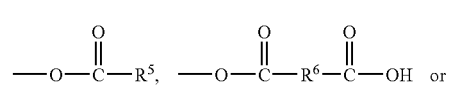

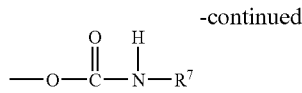

wherein $R^5$ and $R^7$, independently of each other, represent an alkyl, aryl, aralkyl or alkylaryl group and $R^6$ is a divalent alkyl, aryl, aralkyl or alkaryl group, p is 0, 1, 2, 3, inclusive, m and n are, independently, an integer from 2, 3, 4, 5, inclusive; x and y are, independently, integers from 1 to 350, inclusive and z is from 0 to 200, inclusive.

A method of reducing water in a gypsum slurry includes preparing a gypsum slurry that includes water, calcined gypsum, a defoamer and the dispersant described above. A first portion of retarder is added to the slurry, the first portion being an amount of retarder sufficient to substantially prevent buildup of gypsum crystals within the mixer. A second portion of retarder is also added to the slurry, the second portion being an amount of retarder sufficient to increase the fluidity of the slurry beyond that obtained by addition of the first portion of retarder.

Addition of both portions of retarder not only keeps the mixer free of gypsum solids, but increases the flowability of the slurry. Since it is desirable to maintain a constant slurry fluidity, the increased flowability can be realized as a reduction in water at the same dispersant level, or reduction of dispersant using the same amount of water. Either results in a reduction of raw materials and possible cost savings.

Some embodiments include mixtures or combinations of the defoamer and the dispersant that are combined prior to their addition to the slurry. The defoamer and the slurry are combined in a physical mixture in at least one embodiment of the invention. In at least one other embodiment, the defoamer is attached onto the dispersant's polymer structure. Combinations of the physical mixture and the attached defoamer are also useful.

There is, further, an improvement in fluidity when defoamer is added with dispersant to the foamed slurry. This increased flowability results in the ability to reduce the amount of water added to the slurry for a given flowability, or the ability to reduce the amount of dispersant. In either case, a possible cost reduction is obtained either from reduced drying fuel use or a direct reduction in the dispersant use.

DETAILED DESCRIPTION OF THE DRAWING

FIG. 1 is a graph of the void volume as a function of the void diameter for two different dispersants.

DETAILED DESCRIPTION OF THE INVENTION

One embodiment of the present invention is directed to a gypsum slurry. The slurry includes water, a hydraulic component, foam, a defoamer and a polycarboxylate dispersant. Unless otherwise noted, components of the slurry are measured by weight, based on the total dry hydraulic component weight.

The hydraulic component includes at least 50% calcined gypsum by weight based on the dry weight of the hydraulic component. Preferably, the amount of calcined gypsum in the hydraulic component is greater than 50%. Other embodiments of the invention utilize hydraulic components that include greater than 65% or greater than 80% calcined gypsum based on the dry weight of the hydraulic component. In many wallboard formulations, the hydraulic material is substantially all calcined gypsum. Any form of calcined gypsum may be used, including but not limited to alpha or beta stucco. Use of calcium sulfate anhydrite, synthetic gypsum or landplaster is also contemplated. Other hydraulic materials, including cement and fly ash, are optionally included in the slurry.

Foam is added to the slurry to control the density of the finished product. Any of the conventional foaming agents known to be useful in preparing foamed gypsum products can be employed. Many such foaming agents are well known and readily available commercially, e.g. the HYONIC line of soap products from GEO Specialty Chemicals, Ambler, Pa. Foams and one method for preparing foamed gypsum products are disclosed in U.S. Pat. No. 5,683,635, herein incorporated by reference. This patent teaches the inclusion of large bubbles into the foam size distribution by varying the ratio of a first foaming agent and a second foaming agent. Control of foam bubble size is important to the strength of the finished panel product. The first foaming agent is from about 65% to about 85 wt. % based on the total weight of all foaming agents.

An example of the first foaming agent, useful to generate unstable foams, has the formula:

$$CH_3(CH_2)_x(CH_2)(OCH_2)_yOSO_3\text{-}M \quad \quad (VI)$$

wherein X is a number from 2 to 20, Y is a number from 0 to 10 and is greater than 0 in at least 50 weight percent of the foaming agent, and M is a cation.

An example of the second foaming agent, useful to generate stable foams, has the formula:

$$R'\text{—}OSO_3\text{-}M \quad \quad (VII)$$

wherein R' is an alkyl group containing from 2 to 20 carbon atoms, and M is a cation. Preferably, R' is an alkyl group containing from 8 to 12 carbon atoms. The cation of either the first or second foaming agent, independently, includes at least one of sodium, potassium, magnesium, ammonium, quaternary ammonium and mixtures thereof.

The addition of one or more defoamers with the polycarboxylate dispersant has been found to permit further altering of the size of bubbles and thereby control the production of larger voids. As the stucco sets, the interlocking matrix of calcium sulfate dihydrate crystals forms around the bubbles, leaving voids in the set material. In the discussion that follows, the exemplary void size distribution is discussed as it applies to a gypsum panel core, however, it is contemplated that the slurry of this invention could be useful in other gypsum-based products.

FIG. 1 is an example of how the change in dispersants can alter the distribution of the void sizes. When some polycarboxylate dispersants are used, a large number of tiny, stable bubbles are formed in the slurry. This is seen in the graph of the void size distribution of a gypsum product made with MELFLUX PCE 356 L/35% ND, shown on the graph as "356". Inclusion of a defoamer and optional surfactant in the gypsum product labeled "410" (made with MELFLUX PCE 410 L/35% FF) reduces the number of tiny voids, and provides a wider distribution of void diameters and an increased number of large voids. Gypsum products of similar density having a wide distribution of void diameters are stronger than those having a large number of small voids.

Some embodiments of the invention use a blend of stable and unstable soaps. In at least one embodiment, the stable soap is a conventional soap having an alkyl chain length of 8-12 carbon atoms and an ethoxy group chain length of 1-4 units. An example of an unstable soap is an unethoxylated soap with an alkyl chain length of 6-16 carbon units. Some embodiments utilize a predominant amount of the stable soap.

When foam is added to the product, the polycarboxylate dispersant is optionally divided between the gauging water and the foam water or two different dispersants are used in the gauging water and the foam water prior to its addition to the calcium sulfate hemihydrate. This method is disclosed in a co-pending application U.S. Ser. No. 11/152,404, entitled, "Effective Use of Dispersants in Wallboard Containing Foam", herein incorporated by reference.

Dispersants that are contemplated are polycarboxylate dispersants. The range of the dispersant used is about 0.01 wt % to about 1.0 wt % dispersant solids, based on hydraulic component content. In some embodiments, the polycarboxylate dispersant includes a plurality of ether-linked polyoxyalkylene chains. Two examples of useful polycarboxylate dispersants are MELFLUX 1641 F ("1641") dispersants and MELFLUX 2641 F ("2641") dispersants. Both are available from BASF Construction Polymers GmbH, Trostberg, Germany. The 1641 dispersant is described in U.S. Pat. No. 5,798,425, herein incorporated by reference. It is a two-monomer copolymer having vinyl ether and olefinic unsaturated carboxylic ester groups. Another suitable class of polycarboxylate dispersants is a three-monomer system exemplified by the 2641 dispersant. The co-polymer and a method of making it are described in U.S. Pat. No. 6,777,517, herein incorporated by reference.

Another dispersant used in some embodiments of the slurry includes two repeating units. The first repeating unit is an olefinic unsaturated mono-carboxylic acid repeating unit, an ester or salt thereof, or an olefinic unsaturated sulphuric acid repeating unit or a salt thereof. Examples of the first repeating unit are acrylic acid, methacrylic acid, crotonic acid, isocrotonic acid, allyl sulfonic acid and vinyl sulfonic acid. Mono- or divalent salts are suitable in place of the hydrogen of the acid group. The hydrogen can also be replaced by hydrocarbon group to form the ester. Preferred repeating units include acrylic acid or methacrylic acid.

The second repeating unit satisfies Formula I,

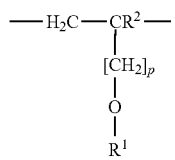

I and $R^1$ is derived from an unsaturated (poly)alkylene glycol ether group according to Formula II.

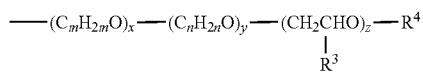

II

Referring to Formulas I and II, the alkenyl repeating unit optionally includes a $C_1$ to $C_3$ alkyl group between the polymer structure and the ether linkage. The value of p is an integer from 0, 1, 2, 3, inclusive. Preferably, p is either 0 or 1. $R^2$ is either a hydrogen atom or an aliphatic $C_1$ to $C_5$ hydrocarbon group, which may be linear, branched, saturated or unsaturated. $R^3$ is a non-substituted or substituted aryl group, preferably phenyl. Examples of preferred repeating units include acrylic acid and methacrylic acid.

The polyether group of Formula II contains multiple $C_2$-$C_4$ alkyl groups, including at least two alkyl groups, connected by oxygen atoms. The m and n are, independently, integers from 2, 3, 4, 5, inclusive, preferably, at least one of m and n is 2. The x and y are, independently, integers from 1 to 350, inclusive. The value of z is from 0 to 200, inclusive. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c).

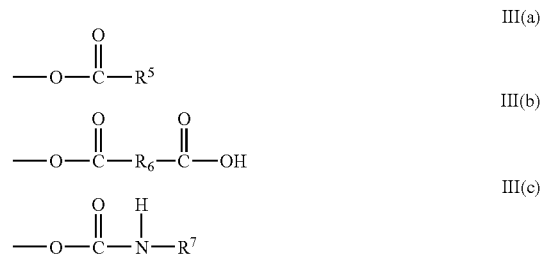

In the above formulas, $R^5$ and $R^7$, independently of each other, represent an alkyl, aryl, aralkyl or alkylaryl group. $R^6$ is a bivalent alkyl, aryl, aralkyl or alkylaryl group.

Dispersants of this group are referenced as the "Melflux PCE" dispersants. Polymers in this series known to be useful in wallboard include MELFLUX PCE 211 L/35% ND, MELFLUX PCE 239 L/35% ND, MELFLUX PCE 267 L/35% ND and MELFLUX PCE 356 L/35% ND. This class of dispersants and how to make them is further described in U.S. Ser. No. 11/451,625, entitled "Polyether-Containing Copolymer", filed Jun. 12, 2006 and herein incorporated by reference. Another suitable dispersant is MELFLUX PCE 410 L/35% FF ("410"), that is made according to U.S. Ser. No. 11/894,029, filed concurrently herewith, previously incorporated by reference.

The molecular weight of the dispersant is preferably from about 20,000 to about 60,000 Daltons. Surprisingly, it has been found that the lower molecular weight dispersants cause more retardation of set time than dispersants having a molecular weight greater than 60,000 Daltons. However, tests with gypsum indicate that efficacy of the dispersant is reduced at molecular weights above 60,000 Daltons.

Many polymers can be made with the same two repeating units using different distributions of them. The ratio of the acid-containing repeating units to the polyether-containing repeating unit is directly related to the charge density. Preferably, the charge density of the co-polymer is in the range of about 300 to about 3000 μequiv. charges/g co-polymer. However, it has also been discovered that the increase in charge density further results in an increase in the retardive effect of the dispersant. Dispersants with a low charge density retard the set times less than a dispersant having a high charge density. Since retardation in set times increases with the increase in efficacy obtained with dispersants of high charge density, making a slurry with low water, good flowability and reasonable set times requires keeping of the charge density in a certain range. Preferably, the charge density of the co-polymer is in the range of about 600 to about 2000 μequiv. charges/g co-polymer.

This Melflux PCE dispersant is particularly well-suited for use with gypsum. While not wishing to be bound by theory, it is believed that the acid repeating units bind to the hemihydrate crystals while the long polyether chains of the second repeating unit on the structure perform the dispersing function. Balancing of the length of the polyether chains, the total molecular weight and the charge density are important factors in designing a dispersant for gypsum. Since the Melflux PCE is less retardive than other dispersants, it is less disruptive to the manufacturing process of certain gypsum products. The dispersant is used in any effective amount. To a large extent, the amount of dispersant selected is dependant on the desired fluidity of the slurry. As the amount of water decreases, more dispersant is required to maintain a constant slurry fluidity. Preferably, the dispersant is used in amounts of about 0.01% to about 0.5% based on the dry weight of the stucco. More preferably, the dispersant is used in amounts of about 0.05% to about 0.2% on the same basis. In measuring a liquid dispersant, only the polymer solids are considered in calculating the dosage of the dispersant, and the water from the dispersant is considered when a water/stucco ratio is calculated. This dispersant allows for the design of a high-speed wallboard manufacturing process where the board is at least 50% set within ten minutes. Even in the absence of accelerators, at least 50% set is achievable within ten minutes.

Polymerization of the repeating units to make the copolymer dispersant is carried out by any method known by an artisan. Preferred polymerization techniques are taught in U.S. Patent Publication No. 2006/0281886, entitled "Polyether-Containing Copolymer", filed Jun. 12, 2006 and published Dec. 14, 2006, herein incorporated by reference.

One or more defoamers are added to the slurry to reduce the bubble stability and thereby increase the distribution of bubble sizes. The addition of one or more defoamers to this polycarboxylate dispersant has been found to produce active bubbles. Active bubbles continuously coalesce, maintaining a size distribution of bubbles. As the stucco sets, the interlocking matrix of calcium sulfate dihydrate crystals forms around the bubbles, leaving voids in the set material. Any defoaming agent can be added to the slurry, including non-ionic surfactants such as copolymers comprising ethylene oxide/propylene oxide-(PO-EO)- units (Dowfax of the Dow Company, Midland, Mich.), EO-PO-EO or PO-EO-PO block polymers, respectively (PLURONIC of BASF) or polysiloxane dispersions such as siloxane by Wacker Chemie AG.

In some embodiments where it is added separate from the dispersant, the silicone compound is a polymerizable siloxane in the form of a stable emulsion. In some embodiments, it is added to the slurry at the mixer. The slurry is then shaped and dried under conditions which promote the polymerization of the siloxane to form a highly cross-linked silicone resin. Preferably, a catalyst which promotes the polymerization of the siloxane to form a highly cross-linked silicone resin is also added to the slurry.

The siloxane is often a fluid, linear hydrogen-modified siloxane, but can also be a cyclic hydrogen-modified siloxane. Such siloxanes are capable of forming highly cross-linked silicone resins. These fluids are well known to an artisan and are commercially available. Typically, the linear hydrogen-modified siloxanes useful are those of the general formula:

where R" represents a saturated or unsaturated monovalent hydrocarbon radical. In preferred embodiments, R" represents an alkyl group and most preferably R" is methyl.

The siloxane emulsion is preferably added to the gauging water before the slurry is formed in order to provide sufficient time for the siloxane emulsion to thoroughly mix with water used to form the slurry. The siloxane emulsion is preferably stabilized prior to addition to the gauging water and well dispersed in the slurry, particularly following the addition of optional additives and during subsequent process steps. A stable siloxane/water emulsion is optionally prepared by combining the siloxane fluid with a small amount of water in a high intensity mixer for 1-2 seconds. No chemical emulsifier is needed. The emulsion thus formed is sufficiently stable that the silicone fluid mixes with the gauging water and remains dispersed while polymerization occurs. Pre-made siloxane emulsions are also useful.

Some embodiments of the invention utilize a methyl hydrogen polysiloxane fluid sold under the name SILRES BS-94 by Wacker-Chemie GmbH as the siloxane. Preferably 0.3 to about 1.0 weight % of the BS-94 fluid is used, based on the weight of the dry stucco. At least one embodiment uses the siloxane fluid in amounts of about 0.4 to about 0.8 weight % on the same basis. Powdered methyl hydrogen polysiloxanes, such as WACKER BS Powder A and WACKER BS Powder G, are also useful.

The hydrogen polysiloxane cures by forming a reactive silanol compound. Polymerization of the siloxane in situ proceeds slowly, taking days or weeks to fully cure. The addition of a catalyst improves the cure rate of the siloxane. Any catalyst, including alkaline earth oxides and hydroxides, known in the prior art is useful. At least some embodiments utilize a dead-burned or hard-burned magnesium oxide catalyst. Baymag 96 (Baymag, Inc., Calgary, Alberta, Calif.) is a commercially available dead-burned magnesium oxide suitable as a catalyst.

Relatively small amounts of the catalyst are needed. About 0.1 to about 0.5% by weight, based on dry calcined gypsum weight, preferably 0.2 to about 0.4% by weight, is used. Preferably, the catalyst has a loss on ignition of less than 0.1% by weight and has a surface area of at least 0.3 m$^2$/g. Additional information regarding the use of magnesium oxide catalysts for curing of siloxane is found in commonly owned U.S. Patent Application Publication No. 2006/0035112, published Feb. 16, 2006, herein incorporated by reference.

The defoamer is optionally added to the slurry in a number of different ways. In at least one embodiment, the defoamer and dispersant are added separately as independent compounds. The weight ratio of the dispersant to the defoamer ranges from about 1000:1 to about 1:1. Addition of the defoamer to the slurry mixer with the polycarboxylate dispersant is contemplated; however, addition of the defoamer to the foam water is also possible.

In yet another embodiment of the invention, the defoamer is combined with the dispersant and the optional surfactant in a liquid composition prior to addition to the gypsum slurry. MELFLUX PCE 410 L/35% FF (BASF Construction Polymers GmbH) is an example of a dispersant combined with a defoamer, optional surfactant and water that provides improved stability over time and which allows homogeneous dosing in wallboard production. Any surfactant is useful that stabilizes the defoamer in the aqueous mixture. Useful surfactants include an ethylene oxide/propylene oxide block copolymer, an alcohol ethyloxide $R^{13}$-(EO)—H with $R^{13}$ being selected from the group consisting of an aliphatic hydrocarbon group having from 1 to 20 carbon atoms, acetylenic diols, monoalkylpolyalkylenes, ethoxylated nonylphenols, alkylethersulfonates and combinations thereof, a styrene/maleic acid copolymer, a fatty alcohol alkoxylate or an alcohol having a carbon chain length of 2 to 20 carbon atoms and a polyalkylene group. Use of combinations of these surfactants is also contemplated. The weight ratio of the dispersant to the surfactant is about 1000:1 to about 1:1.

A further embodiment of the invention is contemplated whereby a first portion of the defoamer is attached to the dispersant chain, while a second portion of the defoamer is unattached. This would occur, for example, where only the first portion of the defoamer was successfully attached to the dispersant polymer chain. The second portion of defoamer could then be present in the aqueous admixture to provide defoaming action in addition to that provided by the attached defoamer. If present in the aqueous admixture, the unattached defoamer would be physically dispersed in the mixture. If present in the gypsum slurry, the unattached defoamer would be substantially dispersed in the slurry.

When the defoamer is present as a third moiety attached onto the dispersant, the additional monomer should be represented in the copolymer in amounts up to about 5 mol %, or from about 0.05 to about 3 mol %. Examples of the third moiety include structures of the Formulas IV(a) and IV(b):

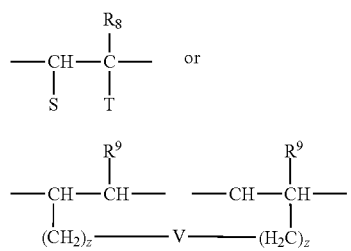

In the formula IV(a), $R^8$ can be H or $CH_3$ depending on whether the structural units are acrylic or methacrylic acid derivatives. In formula IV(b), $R^9$ can be hydrogen, an aliphatic hydrocarbon radical having from 1 to 20 carbon atoms, a cycloaliphatic hydrocarbon radical having from 5 to 8 carbon atoms, an aryl radical having from 6 to 14 carbon atoms which may also be substituted. S can be —H, —COO$_a$M or —COOR$^{11}$, where a is ½ or 1, M is a hydrogen, a monovalent or divalent metal cation, an ammonium ion or an organic amine radical, $R^{11}$ is an aliphatic hydrocarbon radical having from 3 to 20 carbon atoms, a cycloaliphatic hydrocarbons radical having from 5 to 8 carbon atoms or an aryl radical having from 6 to 14 carbon atoms. The aliphatic hydrocarbon radical can be linear or branched, saturated or unsaturated. Preferred cycloaliphatic hydrocarbon radicals are cyclopentyl or cyclohexyl radicals; preferred aryl radicals are phenyl or naphthyl radicals. In the case of T=—COOR$^5$, S=COO$_a$M or —COOR$^5$. When both T and S are —COOR$^5$, the corresponding structural units are derived from dicarboxylic esters. From about 0.1 to 5 mol % of the structural units are the defoaming moieties.

Apart from these ester groups, the structural units may also include other hydrophobic structural elements. These include polypropylene oxide or polypropylene oxide-polyethylene oxide derivatives of the formula V:

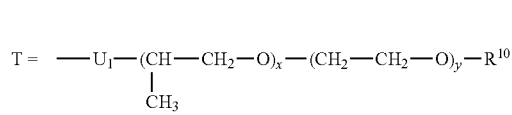

X is from 1 to 150 and y is from 0 to 15. The polypropylene oxide(polyethylene oxide) derivatives can be linked via a group $U^1$ to the ethyl radical of the structural unit corresponding to the formula IV(a), where $U^1$=—CO—NH—, —O—, or —CH$_2$—O—. The structural unit is thus the amide, vinyl ether or allyl ether corresponding to the structural unit of the formula IV(a). $R^{10}$ may in turn be as defined for $R^9$ (see above) or be

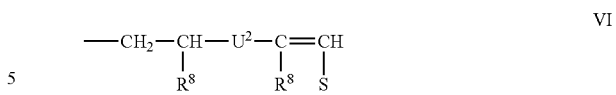

where $U^2$=—NH—CO—, —O—, —OCH$_2$— and S is as defined above. These compounds are polypropylene oxide (-polyethylene oxide) derivatives of the bifunctional alkenyl compounds corresponding to the formula IV(a).

As a further hydrophobic structural element, the compounds of the formula IV(a) may contain polydimethylsiloxane groups, which formula IV(a) corresponds to T=—W—$R^7$. W is:

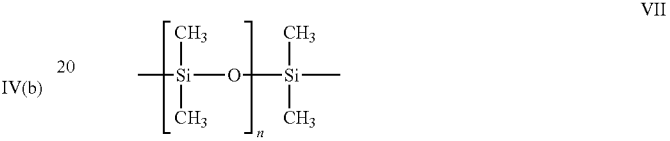

(hereinafter referred to as a polydimethylsiloxane group), $R^7$ can be as defined for $R^2$ and n can be from 2 to 100.

The polydimethylsiloxane group can not only be bound directly to the ethylene radical of the formula IV(a), but also via the group —CO—[NH—(CH$_2$)$_s$]—W—$R^{12}$ or —CO—O(CH$_2$)—W—$R^{12}$, where $R^{12}$ is preferably as defined for $R^9$ and s=1 or 2 and z=0 to 2. $R^{12}$ may also be a radical of the formula:

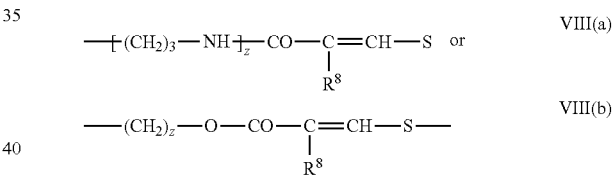

The compounds are bifunctional ethylene compounds of the formula IV(a) which are linked to one another via the respective amide or ester groups, with only one ethylene group having been copolymerized.

A similar situation applies to the compounds of the formula IV(a) in which T=(CH$_2$)$_z$—V—(CH$_2$)$_z$—CH=CH—$R^2$, where z=0 to 4, V is either a polydimethylsiloxane radical W or a —O—CO—C$_6$H$_4$—CO—O— radical and $R^9$ is as defined above. These compounds are derived from the corresponding dialkylphenyldicarboxylic acid esters or dialkylenepolydimethylsiloxane derivatives.

Alternatively, other co-monomers, such as styrene or acrylamides are co-polymerized with the primary two monomers. Components with hydrophobic properties may be used. Compounds with ester structural units, polypropylene oxide or polypropylene oxide-polyethylene oxide (PO/PE), polybutylene oxide-polyoxyethylene (PB/PE) or polystyrene oxide-polyethylene oxide (PS/PE) units are preferred. Compounds disclosed by U.S. Pat. Nos. 5,798,425 and 6,777,517 are also preferred.

The aqueous mixture is then preferably added to the gauging water before the mixer, to foam water, or to the mixer as a separate stream. Addition of the solution during other process steps is also contemplated.

Water is added to the slurry in any amount that makes a flowable slurry. The amount of water to be used varies greatly according to the application with which it is being used, the exact dispersant being used, the properties of the stucco and the additives being used. The water to stucco ratio ("WSR") with wallboard is preferably about 0.1 to about 0.9 based on the dry weight of the stucco. Commonly a WSR of about 0.2 to about 0.85 is preferred. Flooring compositions preferably use a WSR from about 0.17 to about 0.45, preferably from about 0.17 to about 0.34. Moldable or castable products preferably use water in a WSR of from about 0.1 to about 0.3, preferably from about 0.16 to about 0.25. The WSR can be reduced to 0.1 or less in laboratory tests based on the moderate addition of the Melflux PCE dispersants.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Surprisingly, it has also been found that the use of some retarders with the Melflux PCE family of dispersants gives an unexpected increase in the dispersant efficacy. Normally a first portion of retarder is added to the slurry to prevent solids build-up in the mixer and associated slurry contacting parts. If the calcined gypsum starts to set, dihydrate crystals deposit on the mixer interior and associated slurry contacting parts. Some retarders delay the onset of crystallization, thereby preventing set gypsum lumps from forming while the slurry is inside the mixer and associated slurry contacting parts, which could later break free to negatively impact the product and/or production thereof. The first portion of set retarders is normally added in amounts of up to about 1 lb./MSF (4.9 g/m$^2$). The exact amount of retarder used for a particular slurry varies greatly depending on the properties of the gypsum and other raw materials used, type of calcination, amount and types of additives present.

However, in the presence of Melflux PCE dispersants, a second portion of the retarder appears to have the ability to reduce the amount of water, dispersant or both needed to fluidize the slurry even beyond that necessary to keep the mixer clean and substantially free of gypsum solids. Further, the reduction in PCE dosage changes non-linearly as the amount of retarder is added linearly. For example, the synergistic use of VERSENEX 80E Chelating Agent (Dow Chemical Co., Midland, Mich.) with Melflux 410 L/35% FF dispersant has been shown to allow reduction in the amount of dispersant up to 37%, based on making a slurry of constant fluidity and similar set characteristics. In some embodiments of the present invention, the second portion of retarder is about 0.05 to about 0.3 lb/MSF in addition to the first portion of retarder. In other embodiments, ranges for the second retarder are about 0.05 to about 0.5 lb/MSF or about 0.5 to about 1 lb/MSF. Larger second portion doses can be used where any developing processing issues can be overcome. If the product is too soft at the knife for cutting, a certain amount of accelerator can be added to overcome the effects of the retarder.

The first retarder portion and the second retarder portion can be added to the slurry either individually or as a combined dose. The retarder is useful as either the first portion of the retarder, the second portion of the retarder or both. Some embodiments of the invention utilize a diethylenetriamine-penta-acetate (DTPA) retarder. At least one embodiment uses pentasodium DTPA, known as VERSENEX 80E. Other retarders are expected to show similar improvement in PCE efficacy, including penta sodium salt of amino tri(methylene phosphonic acid) (Dequest 2006 dispersant, Thermphos Trading GmbH), tartaric acid, succinic acid, citric acid, maleic acid and their corresponding salts (Na, K, NH$_4$, Li).

Additional additives are also added to the slurry as are typical for the particular application to which the gypsum slurry will be put. Dry accelerators (up to about 45 lb./MSF (219 g/m$^2$)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from United States Gypsum Company, Southard, Okla. plant, and is made according to U.S. Pat. No. 3,573,947, herein incorporated by reference. Potassium sulfate, aluminum sulfate, sodium sulfate and sodium bisulfate are other preferred accelerators. HRA is calcium sulfate dihydrate freshly ground with sugar at a ratio of about 3 to 25 pounds of sugar per 100 pounds of calcium sulfate dihydrate. It is further described in U.S. Pat. No. 2,078,199, herein incorporated by reference. Starch may be used in place of the sugar as taught in U.S. Pat. No. 4,019,920, herein incorporated by reference. Other accelerators may be used as are known to those skilled in the art.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. The wet gypsum accelerator is used in amounts ranging from about 5 to about 80 pounds per thousand square feet (24.3 to 390 g/m$^2$) of board product.

In some embodiments of the invention, additives are included in the gypsum slurry to modify one or more properties of the final product. Additives are used in the manner and amounts as are known in the art. Concentrations are reported in amounts per 1000 square feet of finished board panels ("MSF"). Glass fibers or paper fibers are optionally added to the slurry. Wax emulsions or silioxanes are added to the gypsum slurry to improve the water-resistency of the finished gypsum board panel.

A trimetaphosphate compound is added to the gypsum slurry in some embodiments to enhance the strength of the product and to improve sag resistance of the set gypsum. Preferably the concentration of the trimetaphosphate compound is from about 0.004% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate loses its ability to strengthen the product and the slurry becomes severely retardive.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination. One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Bunge Milling Inc (St. Louis, Mo.) and AMERIKOR 818 and HQM PREGEL starches, both commercially available from Archer Daniels Midland Company. If included, the pregelatinized starch is present in any suitable amount. For example, if included, the pregelatinized starch in either dry powder or liquid form can be added to the mixture used to form the set gypsum composition such that it is present in an amount of from about 0.5% to about 1.5% percent solids by weight of stucco.

Other known additives may be used as needed to modify specific properties of the product. Sugars, such as dextrose, are used to improve the paper bond at the ends of the boards. If stiffness is needed, boric acid is commonly added. Fire retardancy can be improved by the addition of vermiculite. These and other known additives are useful in the present slurry and wallboard formulations.

In operation, the calcined gypsum is moved in a conveyor toward a mixer. Prior to entry into the mixer, dry additives, such as dry set accelerators, are added to the powdered calcined gypsum. Other additives may also be added to the water. This is particularly convenient where the additives are in liquid form. For most additives, there is no criticality regarding placing the additives in the slurry, and they may be added using whatever equipment or method is convenient. When using the Melflux PCE dispersant, it is important to add the dispersant to the water prior to addition of the stucco.

The foamed slurry travels to the board line in a soft, pliable boot where it is deposited on a paper facing sheet and spread across the width of the sheet. A second paper facing sheet is optionally applied to the top of the slurry, forming a sandwich of continuous gypsum board. The sandwich then passed under a forming plate to press the facing into the soft slurry and to level the forming board to a consistent thickness.

In some embodiments, the gypsum product is made by an iterative process for "fine tuning" the void size distribution. The optimum void size distribution for a particular product is, in some cases, partially defined by local markets. Variations in raw materials or other process conditions can also have an effect on the void size distribution. To obtain a desirable void size distribution, or to maintain a distribution under varying conditions, it may be advantageous to make changes or corrections in the void size distribution. In some embodiments, the void size distribution can be varied even after the amount and type of polycarboxylate dispersant and defoamer have been fixed. While adjustments are being made using this method, it is assumed that other process conditions, particularly the water to stucco ratio, are being held substantially constant.

In this method, changes are made to the initial concentration of the aqueous soap mixture of the one or more soaps and the foam water. Useful ranges for the weight concentration of soap in the aqueous soap mixture for various embodiments are from about 0.1% to about 2%, about 0.1 to about 1.5%, from about 0.2% to about 1% from about 0.15% to about 0.75% from about 0.3% to about 0.75%, from about 0.25 to about 0.5% from about 0.2% to about 0.4% and from about 1% to about 2%.

The foam is pregenerated from the aqueous soap mixture. One method of making the foam is using a foam generator that mixes the soap solution with air. Any method of mixing can be used to combine the soap with air that causes bubbles to be formed, including agitation, turbulent flow or mixing. The amount of water and air are controlled to generate foam of a particular density. Adjustment of the foam volume is used to control the overall dry product weight.

Such a foaming agent mixture can be pre-blended "off-line", i.e., separate from the process of preparing the foamed gypsum product. However, it is preferable to blend the first and second foaming agents concurrently and continuously, as an integral "on-line" part of the mixing process. This can be accomplished, for example, by pumping separate streams of the different foaming agents and bringing the streams together at, or just prior to, a foam generator that is employed to generate the stream of aqueous foam which is then inserted into and mixed with the calcined gypsum slurry. By blending in this manner, the ratio of the first and second foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. Nos. 5,643,510 and 5,683,635, previously incorporated by reference.

The gypsum slurry is prepared by combining gauging water, the hydraulic component, the defoamer and the polycarboxylate dispersant and mixing them until a homogeneous slurry is obtained. The dispersant is preferably added to the gauging water, the foam water, split between the gauging and foam water or added directly to the mixer. Dry components are combined at the stucco conveyor and moved by conveyor to the mixer. As the conveyor moves, optional dry components including clay and set accelerators may be added to the stucco. The dry components and gauging water were continuously added to a high-shear mixer to form the gypsum slurry. Optional wet components, such as anti-sag agents and set retarders, are added directly to the mixer. The amount of gauging water, dispersant or both are varied to maintain a constant slump patty size, described in more detail below.

The slurry and the pregenerated foam are combined to make a foamed gypsum core. One method of combining the gypsum slurry and the pregenerated foam is by pressurizing the foam and forcing it into the slurry. At least one embodiment uses a foam ring to distribute the foam. The foam ring is a shaped apparatus that allows the slurry to flow through it. It includes one or more jets or slots for discharge of the pressurized foam into the slurry as the slurry passes the ring. Use of a foam ring is disclosed in U.S. Pat. No. 5,683,635, herein incorporated by reference. Another method of combining the foam and the slurry is by addition of the foam directly to the mixer.

Void size distribution of the foamed gypsum core can be finely controlled by adjusting the concentration of the soaps in the aqueous soap mixture. After a foamed gypsum core has been prepared, inspection of the interior of the gypsum core reveals the void structure. Changes in the void size distribution are produced by varying the soap concentration from the initial or previous concentration. If the interior has too large a fraction of small voids, the soap concentration in the aqueous soap mixture is reduced. If too many very large, oblong or irregularly shaped voids are found, the soap concentration should be increased. Although the optimum void size distribution may vary by product, location or raw materials used, this process technique is useful to move towards the desired void size distribution, regardless of how it is defined. The desirable void size distribution in many embodiments is one that produces a high strength core for the gypsum formulation being used.

For example, in some embodiments, the foamed gypsum core should have a void size distribution where the cumulative volume of voids smaller than 0.25 mm is less than the cumulative volume of voids greater than 0.25 mm. Substantially all of the total volume of voids should substantially be of voids less than or equal to about 1.4 mm in diameter. When these criteria are not met, the concentration of soap in the aqueous soap mixture is adjusted and further samples examined. The concentration of soap in the aqueous soap mixture should be reduced if the cumulative volume of voids smaller than about 0.25 mm is too large. If a significant fraction of the total volume of voids is in voids having a diameter more than 1.4 mm, the concentration of soap in the aqueous soap mixture should be increased. The criteria named above are but two aspects of the optimum core structure of some particular embodiments.

This process is repeatable as often as needed to produce or maintain a desired void size distribution. It is also useful in combination with other methods of changing the void size distribution, such as varying the type or amount of dispersant, varying the foam density or the ratio of stable to unstable soaps, to achieve greater control over the void size distribution.

EXAMPLE 1

A plant trial was conducted to compare naphthalene sulfonate condensate dispersants ("NS") with polycarboxylate dispersants. During the trial, a constant line speed of 215 ft/min of gypsum building panel was produced. The components used in each sample and the process conditions are shown in Table 1 below. Unless otherwise noted, the amount of each of the remaining components is listed in pounds per 1000 square feet of building panel product. "WSR" is the water to stucco ratio, where both foam water, additive water and gauging water are included. Glass fibers were added to all samples at the rate of 0.32% based on the stucco weight. Dextrose was added at 0.17% based on the stucco weight. These two components were added to each of the samples.

Two polycarboxylate dispersants were used. MELFLUX PCE 356 L/35% ND ("356") was a dispersant in water without defoamer and without the optional surfactant. MELFLUX PCE 410 L/35% FF was an aqueous mixture of a polycarboxylate dispersant, a defoamer, a surfactant and water.

The NS dispersant used was Diloflo-CA (Geo Specialty Chemicals, Lafayette, Ind.). In preparation of the foam, Polystep B25 and Steol CS230 soaps (Stepan Company, Northfield, Ill.) were used.

During preparation of the slurry, the amount of dispersant used was varied to create a slurry of substantially uniform flowability as measured by a slump test. The amount of HRA was then adjusted to the minimum amount that gave good hardness at the cutting knife.

TABLE 1

| Description | A | B | C | D |
| --- | --- | --- | --- | --- |
| Stucco | 1778 | 1778 | 1778 | 1778 |
| Gauging Water | 1093 | 1084 | 1081 | 1079 |
| Foam Water | 65 | 66 | 65 | 66 |

TABLE 1-continued

| Description | A | B | C | D |
| --- | --- | --- | --- | --- |
| Total Water | 1182 | 1179 | 1179 | 1178 |
| % WSR | 66.5% | 66.3% | 66.3% | 66.3% |
| Dispersant | NS | 410 | NS | 356 |
| Dispersant Amount | 12 | 6 | 12 | 9 |
| HRA | 18 | 27 | 21 | 33 |
| Retarder | 0.38 | 0.28 | 0.42 | 0.20 |
| Starch | 5 | 5 | 5 | 5 |
| Clay | 34 | 34 | 34 | 34 |
| Total Soap | 0.315 | 0.315 | 0.355 | 0.299 |
| % Unstable Soap | 40% | 35% | 40% | 40% |

Dry components, including the stucco, HRA, starch and clay, were combined prior to continuous addition to the mixer. The gauging water and dispersant were continuously added to the mixer. Meanwhile, the soaps were combined with the foam water to generate a foam external to the mixer. As the slurry was continuously discharged from the mixer, the foam was forced, under pressure, into the slurry. Turbulence as the slurry moved down a soft hose to the forming table was sufficient to blend the foam and the slurry together.

At the forming table, the slurry was deposited onto a facing paper. A second sheet of facing paper was placed on top of the slurry to form a board "sandwich". The sandwich was then passed under a forming plate to evenly distribute the slurry across the width of the paper and to create a sandwich of uniform thickness. The continuous sandwich was then cut into panels at the knife and kiln dried.

As can be seen from Table 1, less dispersant was used in samples containing polycarboxylate dispersants compared to NS dispersants. Further, the 410 dispersant that included the defoamer and surfactant could be used in lower doses than the polycarboxylate dispersant alone. The amounts of retarder and soap were sometimes reduced with the polycarboxylate dispersants, as part of the iterative manufacturing process. Reduction in the amount of dispersant results in a possible cost savings therefrom.

EXAMPLE 2

About 600 grams of calcined gypsum from a western gypsum source was used to make a slurry having a water stucco ratio (WSR) of 0.64. Melflux PCE 410 L/35% FF was added in amounts to provide constant patty size from a slump test.

Foam was generated in a separate foam generator and added to the mixer during the last part of the mixing time. The foam was prepared with a foam generator from a mixture of soap and foam water that included about 0.75% soap. The soap was a 90:10 blend of HYONIC PFM-33 (GEO Specialty Chemicals, Ambler, Pa.) and Steol CS-330. (Stepan Co., Northfield, Ill.). The following procedure describes the remaining process conditions.

The mixing sequence and procedure follows:

1. Water, dispersant, and additives were placed in the Hobart mixer bowl and then mixed by hand.

2. Stucco pre-blended with accelerator and specific additives were added to the bowl and soaked for a short time before the mechanical mixing begins.

3. During mixing, foam was added for density control. The amount of foam addition was varied depending on the targeted density.

4. The slurry was mixed for an additional time after the foam addition ended.

5. The slurry was then tested for slump, stiffening time, density and core structure.

To assure that the tests truly reflected the ability to reduce dispersant dose, it was necessary to adjust other parameters as the amount of retarder was varied. The water/stucco ratio, slump, stiffening time and dry density were kept constant. The slump test is described in U.S. Patent Application Publication No. 2006-0281837, published Dec. 14, 2006, herein incorporated by reference.

All tests were run with the same amount of water to ensure that the water/stucco ratio was the same. If the amount of foam was changed, the gauging water was adjusted so that the total water remained constant. After the amount of retarder was changed, the amount of dispersant was adjusted to maintain a target slump of 18±0.5 cm.

Increase in the retarder sometimes resulted in a lengthening of the stiffening time, and in such cases the amount of accelerator was adjusted to maintain a constant stiffening time of 100±5 seconds. In the Table 2 that follows, "amount" refers to the amount of retarder in lbs/MSF, "stiff" refers to stiffening time in seconds and "CSA" refers to the amount of CSA accelerator in grams.

PCE refers to the amount of MELFLUX PCE 410 L/35% FF dispersant present in grams, while "dose" is the dry-basis amount of dispersant as a weight percent of the dry calcined gypsum weight. Change in the amount of dispersant can change the foaming characteristics of the slurry, therefore the amount of foam was varied to maintain a target dry density of the gypsum cast of 37±1 lb/ft$^3$. The mold for this cast was a 207 ml cup measuring 9.1 cm in height, and filled to the brim. If the slurry settled more than 2 mm from the rim of the cup while the cast was setting, the foam was not sufficiently stable and the test was repeated with a higher concentration of stable soap. Inspection of the interior of the gypsum cast revealed the bubble structure. If all samples had small bubbles, the test was repeated with a lower soap concentration. If very large, oblong or irregularly shaped bubbles were found, the test was repeated with a higher soap concentration. When the adjustments in soaps, dispersant and accelerator were made so that the casts were substantially similar, the % PCE Reduction was calculated as the difference in the amount of PCE used as a percentage of the amount of PCE used in the control sample.

TABLE 2

| Run # | CSA, g | PCE, g | Dose, % | Retarder, lbs/MSF | Slump, cm | Stiff, sec | % PCE Reduction |
|---|---|---|---|---|---|---|---|
| 1 | 2.6 | 2.57 | 0.150 | 0.05 | 18.0 | 100 | Control |
| 2 | 2.9 | 2.40 | 0.140 | 0.10 | 18.0 | 100 | 6.6 |
| 3 | 3.2 | 2.10 | 0.123 | 0.15 | 17.5 | 100 | 18.3 |
| 4 | 4.0 | 1.60 | 0.093 | 0.25 | 18.0 | 105 | 37.7 |

The % PCE reduction shown in these runs is non-linear and is indicative of a synergistic effect between this retarder and the dispersant with a defoaming moiety attached.

EXAMPLE 3

About 600 grams of calcined gypsum from a western gypsum source was used to make a slurry having a water stucco ratio (WSR) of 0.730. This WSR was selected in order to achieve a slump patty size of 18±0.5 cm without any dispersant or retarder.

Foam was generated in a separate foam generator and added to the mixer during the last part of the mixing time. The foam was prepared with a foam generator from a mixture of soap and foam water that included about 0.75% soap. The soap was added with various blends of HYONIC PFM-33 (Geo Specialty Chemicals, Lafayette, Ind.) and Steol CS-330 (Stepan Co., Northfield, Ill.) to produce a similar core void distribution in all cases. The following procedure describes the remaining process conditions.

The mixing sequence and procedure follows:
1. Water, any dispersant, and additives were placed in the Hobart mixer bowl and then mixed by hand.
2. Stucco pre-blended with accelerator and specific additives were added to the bowl and soaked for a short time before the mechanical mixing begins.
3. During mixing, foam was added for density control. The amount of foam addition varied depending on the targeted density.
4. The slurry was mixed for an additional time after the foam addition ends.
5. The slurry was then tested for slump, stiffening time, density, and core structure.

This set of tests included four conditions, for slurries with and without retarder, and with and without dispersant. For each condition, the following parameters were held substantially constant: stiffening time, dry density target, slump patty size, and core void distribution. The slump test was described in U.S. Patent Application Publication No. 2006-0281837, published Dec. 14, 2006, previously incorporated by reference.

If the amount of foam was changed to achieve the desired density, the gauging water was adjusted to balance the change in foam water. The amount of dispersant remained constant in Run #3 and Run #4 when comparing slurries made with and without retarder. Similarly, the amount of retarder remained constant in Run #2 and Run #4 when comparing slurries made with and without dispersant.

Amount of accelerator was adjusted to achieve the desired stiffening time of 115±5 seconds, and the WSR was adjusted to maintain a target slump of 18±0.5 cm throughout the study.

Change in the amount of dispersant or WSR can change the foaming characteristics of the slurry, therefore the amount of foam was varied to achieve the dry density target of 41±1 lbs/ft$^3$. A portion of the slurry was used to fill a 207 ml cup measuring 9.1 cm in height. If the slurry settled more than 2 mm from the rim of the cup while the cast was setting, the foam was not sufficiently stable and the test was repeated with a higher concentration of stable soap. Inspection of the interior of the gypsum cast revealed the bubble structure. If all samples had small bubbles, the test was repeated with a lower soap concentration. If very large, oblong or irregularly shaped bubbles were found, the test was repeated with a higher soap concentration. Adjustments in soaps, accelerator and water were made until the products of each condition were substantially similar. The "WSR Reduction" was calculated by comparing the difference of WSR for each condition versus the control sample from Run #1.

In Table 3 that follows, "Retarder" refers to the amount of retarder in lbs/MSF, "stiff" refers to stiffening time in seconds and "CSA" refers to the amount of CSA accelerator in grams.

"Dispersant" indicates the type of dispersant, while "Dispersant (g)" indicates the amount of dispersant, on a wet basis at 35% solids. "Dose" is the dry-basis amount of dispersant expressed in percent of the dry calcined gypsum weight.

The WSR Reduction of Run #4 with PCE-410 dispersant and retarder was 0.095. This is greater than the sum of the individual effects of Run #2 (the impact of retarder alone which is 0.010 WSR Reduction) and Run #3 (the impact of PCE alone which is 0.075 WSR Reduction). This demonstrates a synergistic effect between this retarder and dispersant with a defoaming moiety attached thereto.

TABLE 3

| Run # | WSR | CSA (g) | Dispersant | Dose (%) | Dispersant (g) | WSR Reduction vs Run#1 | Retarder (lb/MSF) | Slump (cm) | Stiff (sec) |
|---|---|---|---|---|---|---|---|---|---|
| 1 | 0.730 | 1.0 | None | 0.000 | 0.00 | | 0 | 17.8 | 120 |
| 2 | 0.720 | 1.4 | None | 0.000 | 0.00 | 0.010 | 0.15 | 17.5 | 120 |
| 3 | 0.655 | 2.0 | PCE-410 | 0.106 | 1.81 | 0.075 | 0 | 17.5 | 110 |
| 4 | 0.635 | 2.6 | PCE-410 | 0.106 | 1.81 | 0.095 | 0.15 | 17.8 | 115 |

While particular embodiments of the foamed slurry and building panel made therefrom have been shown and described, it will be appreciated by those skilled in the art that changes and modifications may be made thereto without departing from the invention in its broader aspects and as set forth in the following claims.

What is claimed is:

1. A method of reducing water in a gypsum slurry, comprising:
preparing a gypsum slurry comprising water, calcined gypsum, a defoamer and a dispersant, wherein the dispersant consists essentially of a first and a second repeating unit, wherein said first repeating unit is an olefinic unsaturated mono-carboxylic acid repeating unit or an ester or salt thereof, or an olefinic unsaturated sulphuric acid repeating unit or a salt thereof, and said second repeating unit is of the general formula (I)

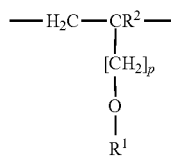

where $R^1$ is represented by

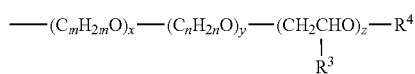

and wherein $R^2$ is hydrogen or an aliphatic $C_1$ to $C_5$ hydrocarbon group, $R^3$ is a non-substituted or substituted aryl group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to the formula

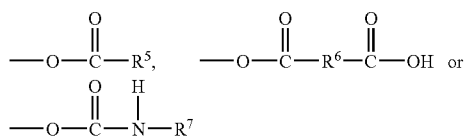

wherein $R^5$ and $R^7$, independently of each other, represent an alkyl, aryl, aralkyl or alkylaryl group and $R^6$ is a divalent alkyl, aryl, aralkyl or alkaryl group, p is 0, 1, 2, 3, inclusive, m and n are, independently, an integer from 2, 3, 4, 5, inclusive; x and y are, independently, integers from 1 to 350, inclusive and z is from 0 to 200, inclusive;
adding a first portion of retarder to the slurry, the first portion being an amount of retarder sufficient to substantially prevent buildup of gypsum crystals within the mixer;
adding a second portion of retarder to the slurry, the second portion being an amount of retarder sufficient to increase the fluidity of the slurry beyond that obtained by addition of the first portion of retarder.

2. The method of claim 1 further comprising selecting the retarder to synergistically increase fluidity in combination with the dispersant.

3. The method of claim 1 wherein said first adding step and said second adding step are combined.

4. The method of claim 1 further comprising combining the defoamer and the dispersant prior to said preparing step.

5. The method of claim 4 wherein said combining step comprises blending the dispersant and the defoamer in an aqueous carrier.

6. The method of claim 4 wherein said combining step comprises chemically or physically attaching the defoamer to the dispersant.

7. The method of claim 6 wherein said combining step includes co-polymerizing a defoaming moiety with the olefinic unsaturated mono-carboxylic acid moiety and the (poly) oxyalkylene moiety.

8. The method of claim 1 wherein the retarder of the first adding step comprises an acid or salt of diethylenetriaminepentaacetate.

9. The method of claim 8 wherein the retarder comprises a sodium salt.

10. The method of claim 9 wherein the retarder comprises a pentasodium salt.

11. The method of claim 1 wherein the retarder of the second adding step comprises an acid or sodium, potassium, ammonium or lithium salt of diethylenetriaminepentaacetate, penta sodium salt of amino tri(methylene phosphonic acid), tartaric acid, succinic acid, citric acid, maleic acid.

12. The method of claim 11 wherein the retarder comprises a sodium salt.

13. The method of claim 11 wherein the retarder comprises a pentasodium salt of diethylenetriaminepentaacetate.

14. A gypsum slurry comprising:
calcined gypsum;
water;
a first portion of a retarder, said first portion being an amount sufficient to substantially prevent formation of gypsum crystals within the mixer;
a second portion of the retarder, said second portion being an amount of retarder sufficient to increase the fluidity of the slurry beyond that obtained by addition of the first portion of retarder;
a defoamer; and a dispersant, wherein said dispersant consists essentially of a first and a second repeating unit, wherein said first repeating unit is an olefinic unsaturated mono-carboxylic acid repeating unit or an ester or salt thereof, or an olefinic unsaturated sulphuric acid repeating unit or a salt thereof, and said second repeating unit is of the general formula (I)

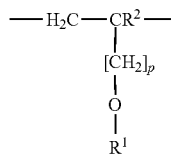     I where $R^1$ is represented by

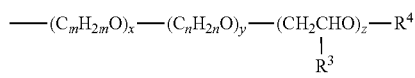     II and wherein $R^2$ is hydrogen or an aliphatic $C_1$ to $C_5$ hydrocarbon group, $R^3$ is a non-substituted or substituted aryl group, and $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming to the formula

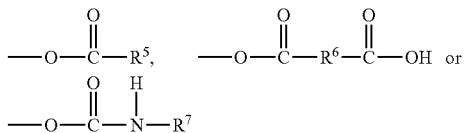     III wherein $R^5$ and $R^7$, independently of each other, represent an alkyl, aryl, aralkyl or alkylaryl group and $R^6$ is a divalent alkyl, aryl, aralkyl or alkaryl group, p is 0, 1, 2, 3, inclusive, m and n are, independently, an integer from 2, 3, 4, 5, inclusive; x and y are, independently, integers from 1 to 350, inclusive and z is from 0 to 200, inclusive.

15. The slurry of claim 14 wherein said first portion of retarder is about 0.1 to about 1 lb/MSF.

16. The slurry of claim 13 wherein said second portion of retarder is about 0.05 to about 0.3 lb/MSF.

17. The slurry of claim 15 wherein said defoamer is combined with said dispersant prior to addition to said slurry.

18. The slurry of claim 17 wherein said defoamer is blended with said dispersant in a carrier.

19. The slurry of claim 17 wherein said defoamer is physically or chemically attached to said dispersant.

20. The slurry of claim 19 wherein said defoamer is a third moiety in said dispersant structure.

21. The slurry of claim 15 wherein at least one of said first retarder and said second retarder is an acid or salt of diethylenetriaminepentaacetate.

* * * * *